United States Patent
Cho et al.

(10) Patent No.: US 11,626,640 B2
(45) Date of Patent: Apr. 11, 2023

(54) BATTERY MODULE INCLUDING SECONDARY BATTERY AND BUS BAR

(71) Applicant: LG Chem, Ltd., Seoul (KR)

(72) Inventors: Hyun-Young Cho, Daejeon (KR); Yong-Il Kim, Daejeon (KR); Yong-Seok Choi, Daejeon (KR)

(73) Assignee: LG Energy Solution, Ltd.

(*) Notice: Subject to any disclaimer, the term of this patent is extended or adjusted under 35 U.S.C. 154(b) by 33 days.

(21) Appl. No.: 16/961,442

(22) PCT Filed: Jun. 11, 2019

(86) PCT No.: PCT/KR2019/007010
§ 371 (c)(1),
(2) Date: Jul. 10, 2020

(87) PCT Pub. No.: WO2019/245214
PCT Pub. Date: Dec. 26, 2019

(65) Prior Publication Data
US 2021/0083244 A1    Mar. 18, 2021

(30) Foreign Application Priority Data
Jun. 22, 2018  (KR) .................. 10-2018-0072154

(51) Int. Cl.
*H01M 50/20* (2021.01)
*H01M 50/502* (2021.01)
(Continued)

(52) U.S. Cl.
CPC ....... *H01M 50/172* (2021.01); *H01M 50/178* (2021.01); *H01M 50/211* (2021.01);
(Continued)

(58) Field of Classification Search
CPC ............. H01M 50/325; H01M 50/183; H01M 50/184; H01M 50/178; H01M 50/186; H01M 50/19; H01M 50/193
(Continued)

(56) References Cited

U.S. PATENT DOCUMENTS

| 8,088,516 | B2 | 1/2012 | Baker et al. |
| 2014/0349181 | A1 | 11/2014 | Lim et al. |
| 2015/0194658 | A1 | 7/2015 | Choi |
| 2017/0125774 | A1 | 5/2017 | Choi et al. |

(Continued)

FOREIGN PATENT DOCUMENTS

| CN | 104766939 A | 7/2015 |
| CN | 104882584 A | 9/2015 |

(Continued)

OTHER PUBLICATIONS

Kobayashi (translation) (Year: 2013).*
Sun (translation) (Year: 2015).*
International Search Report for PCT/KR2019/007010 dated Dec. 26, 2019, 3 pages.
(Continued)

*Primary Examiner* — Matthew T Martin
*Assistant Examiner* — Paul Christian St Wyrough
(74) *Attorney, Agent, or Firm* — Lerner, David, Littenberg, Krumholz & Mentlik, LLP

(57) ABSTRACT

A battery module includes a plurality of secondary batteries, each including an electrode assembly and an electrolyte accommodated in an inner space of an exterior case. The battery module also includes an electrode lead having a body and a plate-shaped head portion. A first end of the body is electrically connected to a positive electrode plate or a negative electrode plate of the electrode assembly, and a second end of the body protrudes outward from the exterior case. The plate-shaped head extends in both directions (Continued)

perpendicular to the protruding direction of the body from the second end. The battery module also includes a bus bar having a plate shape with a slit extending inwardly from one end thereof so as to receive a portion of the body. The electrode lead and the bus bar may be at least partially made of an electrically conductive material.

19 Claims, 10 Drawing Sheets

(51) Int. Cl.
 H01M 50/543 (2021.01)
 H01M 50/172 (2021.01)
 H01M 50/50 (2021.01)
 H01M 50/553 (2021.01)
 H01M 50/211 (2021.01)
 H01M 50/533 (2021.01)
 H01M 50/178 (2021.01)
(52) U.S. Cl.
 CPC ......... *H01M 50/50* (2021.01); *H01M 50/502* (2021.01); *H01M 50/533* (2021.01); *H01M 50/553* (2021.01); *H01M 2220/20* (2013.01)
(58) Field of Classification Search
 USPC ........................................................ 429/158
 See application file for complete search history.

(56) References Cited

U.S. PATENT DOCUMENTS

| 2018/0047518 | A1 | 2/2018 | Kuboki et al. |
| 2019/0189979 | A1 | 6/2019 | Choi et al. |

FOREIGN PATENT DOCUMENTS

| CN | 106133948 | A | | 11/2016 |
| CN | 108140778 | A | | 6/2018 |
| JP | H09213299 | A | | 8/1997 |
| JP | 4617672 | B2 | | 1/2011 |
| JP | 4984366 | B2 | | 7/2012 |
| JP | 2013118115 | A | * | 6/2013 |
| JP | 2013118115 | A | | 6/2013 |
| JP | 2015153486 | A | | 8/2015 |
| JP | 2016177933 | A | | 10/2016 |
| KR | 20060115206 | A | | 11/2006 |
| KR | 20150086218 | A | | 7/2015 |
| KR | 2015103496 | A | * | 9/2015 |
| KR | 20150103496 | A | | 9/2015 |

OTHER PUBLICATIONS

Extended European Search Report including Written Opinion for Application No. 19822155.8 dated Mar. 12, 2021, pp. 1-9.
Search Report dated Feb. 21, 2022 from the Office Action for Chinese Application No. 201980006962.9 dated Mar. 3, 2022, 3 pages.

* cited by examiner

BATTERY MODULE INCLUDING SECONDARY BATTERY AND BUS BAR

CROSS-REFERENCE TO RELATED APPLICATIONS

The present application is a national phase entry under 35 U.S.C. § 371 of International Application No. PCT/KR2019/007010 filed Jun. 11, 2019, which claims priority from Korean Patent Application No. 10-2018-0072154 filed on Jun. 22, 2018, the disclosures of which are incorporated herein by reference.

TECHNICAL FIELD

The present disclosure relates to a battery module including a secondary battery and a bus bar, and more particularly, to a battery module allowing easy fabrication between the secondary battery and the bus bar and ensuring improved product durability and improved space utilization rate.

BACKGROUND ART

In recent years, the demand for portable electronic products such as notebooks, video cameras, mobile phones, or the like is rapidly increasing, and electric vehicles, energy storage batteries, robots, satellites, and the like are being developed in earnest. For this reason, high-performance secondary batteries enabling repeated charging and discharging are being actively researched.

Secondary batteries currently commercialized include nickel cadmium batteries, nickel hydrogen batteries, nickel zinc batteries, lithium secondary batteries and so on. Among them, the lithium secondary batteries are more prominent in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery pouch exterior, hermetically containing the electrode assembly together with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

In recent years, secondary batteries have been widely used not only in small-sized devices such as portable electronic devices but also in medium-sized or large-sized devices such as vehicles and power storage devices. When secondary batteries are used in medium-sized or large-sized devices, a large number of secondary batteries are electrically connected to increase capacity and power. In particular, pouch-type secondary batteries are widely used for medium-sized or large-sized devices since they may be easily stacked.

In addition, in order to electrically connect the secondary batteries inside a battery module, electrode leads are connected to each other, and the connection portions may be welded to maintain the connected state. Further, the battery module may have parallel and/or series electrical connections between the secondary batteries. For this, one end of the electrode lead may be fixed in contact to the bus bar by welding or the like for electrical connection between each secondary battery.

Also, the electrical connection between the secondary batteries is frequently configured by bonding the electrode leads to the bus bar. At this time, in order to electrically connect a plurality of secondary batteries in parallel, electrode leads of the same polarity are bonded to each other. Also, in order to electrically connect a plurality of secondary batteries in series, electrode leads of different polarities are bonded to each other.

Meanwhile, in the conventional art, a process of bending an end of an electrode lead is performed so that the electrode lead of a secondary battery is connected and contacted to a bus bar, and the bent portion of the electrode lead may be joined to one surface of the bus bar by means of laser or ultrasonic welding.

However, for the electrode lead bending process, it is required to bend a plurality of electrode leads formed at a plurality of secondary batteries one by one, which leads to large workloads. In addition, since it is not easy to allow the bent end of the electrode lead made of a flexible material to stably contact one surface of the bus bar, the welding process is difficult and high welding reliability is not easily secured.

In addition, in order to provide the bent portion of the electrode lead, it is necessary to form a longer electrode lead at the secondary battery, which makes it difficult to handle the secondary batteries and also increases the material cost.

DISCLOSURE

Technical Problem

The present disclosure is designed to solve the problems of the related art, and therefore the present disclosure is directed to providing a battery module, which may allow easy fabrication between a secondary battery and a bus bar and ensure improved product durability and improved space utilization rate.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of secondary batteries, each including an electrode assembly having a positive electrode plate and a negative electrode plate with a separator being interposed therebetween, an electrolyte, an exterior case configured to accommodate the electrode assembly and the electrolyte in an inner space thereof, and an electrode lead having a body whose one end is electrically connected to the positive electrode plate or the negative electrode plate of the electrode assembly and the other end protrudes outward from the exterior case and a plate-shaped head extending in both directions perpendicular to the protruding direction of the body from the other end of the body, the electrode lead being at least partially made of an electrically conductive material; and a bus bar having a plate shape at least partially made of an electrically conductive material, the bus bar having a slit formed to extend inward from one end thereof so that a portion of the body is inserted into the slit.

Also, the head may be formed such that a thickness thereof in a direction facing the bus bar is greater than a thickness of the body in a direction perpendicular to a relatively broader side surface of the body among side surfaces of the body.

Moreover, at least a portion of the body may have a thickness gradually increasing toward the head.

In addition, the body may have a stopper formed at a portion thereof to protrude outward.

Also, the body may be shaped such that at least a portion thereof has a width gradually decreasing toward the head.

Moreover, the electrode lead may include a first electrode lead and a second electrode lead provided at the same side surface of the secondary battery and having different electric polarities.

In addition, heads of the first electrode lead and the second electrode lead may be formed to be biased to one side or the other side with respect to the center of the body so as to be positioned adjacent to each other.

Also, a fixing protrusion protruding toward the body of the electrode lead, which is inserted into the slit, may be formed at a portion of an inner surface of the slit.

Further, at least a portion of the slit may have a spaced width gradually decreasing inward from one end thereof.

In addition, in another aspect of the present disclosure, there is also provided a secondary battery, comprising:

an electrode assembly having a positive electrode plate and a negative electrode plate with a separator being interposed therebetween; an electrolyte; an exterior case configured to accommodate the electrode assembly and the electrolyte in an inner space thereof; and an electrode lead having a body whose one end is electrically connected to the positive electrode plate or the negative electrode plate of the electrode assembly and the other end protrudes outward from the exterior case so that a portion of the body is inserted into a slit formed at a bus bar having a plate shape at least partially made of an electrically conductive material to extend inward from one end of the bus bar and a plate-shaped head extending in both directions perpendicular to the protruding direction of the body from the other end of the body, the electrode lead being at least partially made of an electrically conductive material.

Also, in another aspect of the present disclosure, there is also provided a battery pack, comprising at least one battery module according to the present disclosure.

Also, in another aspect of the present disclosure, there is also provided a vehicle, comprising the battery pack according to the present disclosure.

Advantageous Effects

According to an embodiment of the present disclosure, since the electrode lead of the secondary battery has a body and a head, one surface of the head may be disposed in contact with one surface of the bus bar without performing a process of separately bending an end of the electrode lead to contact one surface of the bus bar, thereby effectively reducing the process time and manufacturing cost for the battery module.

In addition, according to this embodiment of the present disclosure, since a stopper is formed at a portion of the body of the electrode lead of the secondary battery, it is possible to prevent the head from moving in the upper and lower direction when the portion of the body is inserted into the slit of the bus bar, and also the lower surface of the head may be fixed to the upper surface of the bus bar. Accordingly, the electrode lead and the bus bar may be welded easily.

Further, according to an embodiment of the present disclosure, since the electrode lead of the secondary battery has an inclined structure formed at a portion of the body, the material cost of the electrode lead may be reduced, and also the body may be inserted into the slit of the bus bar by using the inclined structure. In addition, the length of the body inserted into the slit may be reduced, and thus the inserting process may be performed more easily.

Also, according to an embodiment of the present disclosure, if the heads of the first electrode lead and the second electrode lead of the secondary battery are formed to be biased toward one side or the other side with respect to the center of the body so that the heads are positioned adjacent to each other, the bus bars respectively connected to the first electrode lead and the second electrode lead may be located close to the center of the secondary battery, thereby effectively reducing the volume of the battery module.

Moreover, according to an embodiment of the present disclosure, since the bus bar has a fixing protrusion formed on the inner surface of the slit, the inserted electrode lead may stably keep its inserted and fixed state, and thus the bus bar and the electrode lead may be welded easily.

In addition, according to another embodiment of the present disclosure, since the bus bar is shaped such that the spaced width of the slit gradually decreases inward from one end, the inserted electrode lead may keep its inserted and fixed state stably by the decreased slit width, and thus the bus bar and the electrode lead may be welded easily.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but rather interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustration only, not intended to limit the scope of the disclosure, so it should be understood that other equivalents and modifications could be made thereto without departing from the scope of the disclosure.

Figure 1:
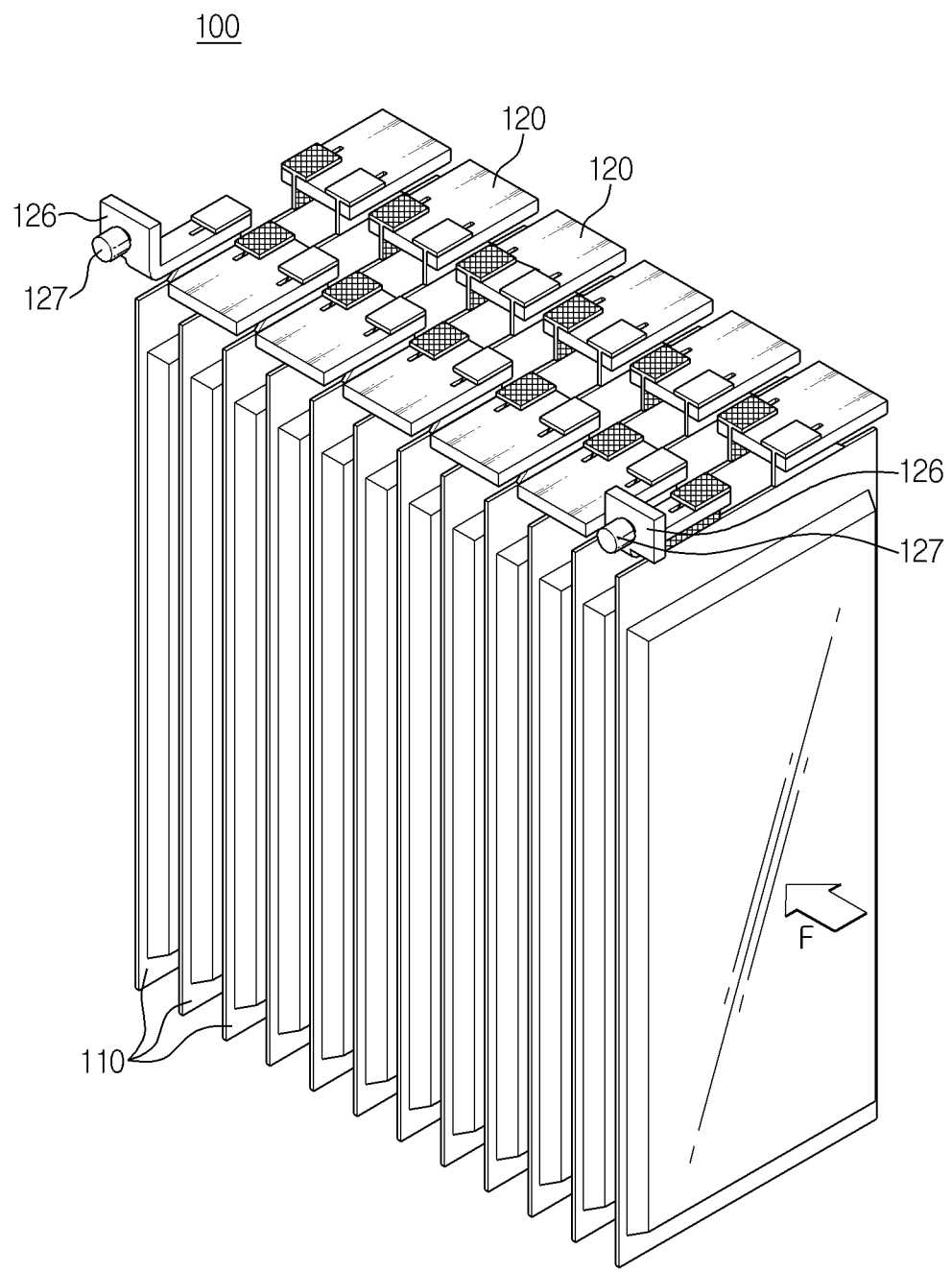
FIG. 1 is a perspective view schematically showing a battery module according to an embodiment of the present disclosure.
Figure 2:
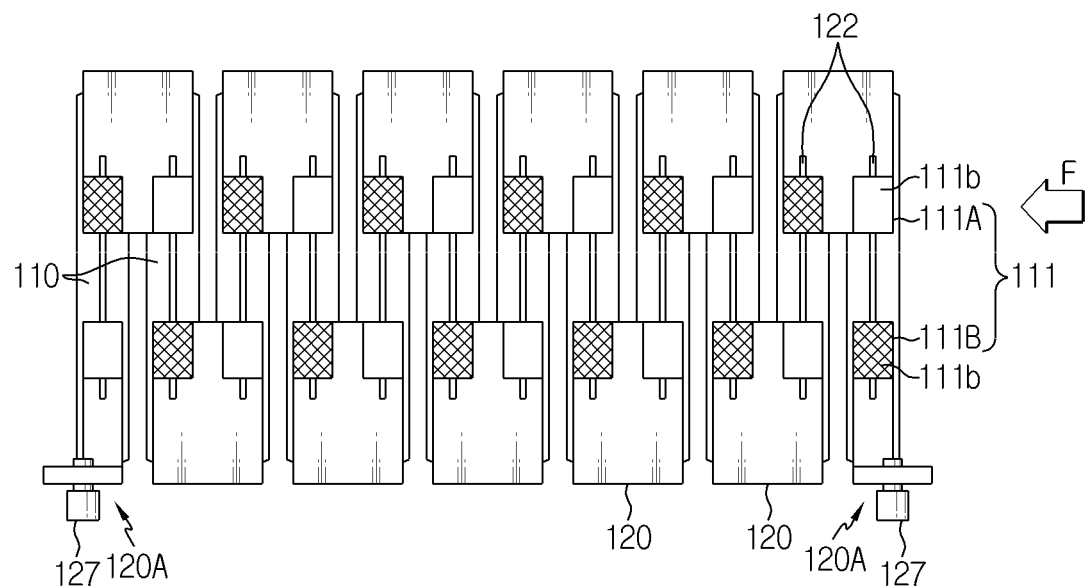
FIG. 2 is a plan view schematically showing the battery module according to an embodiment of the present disclosure.
Figure 3:
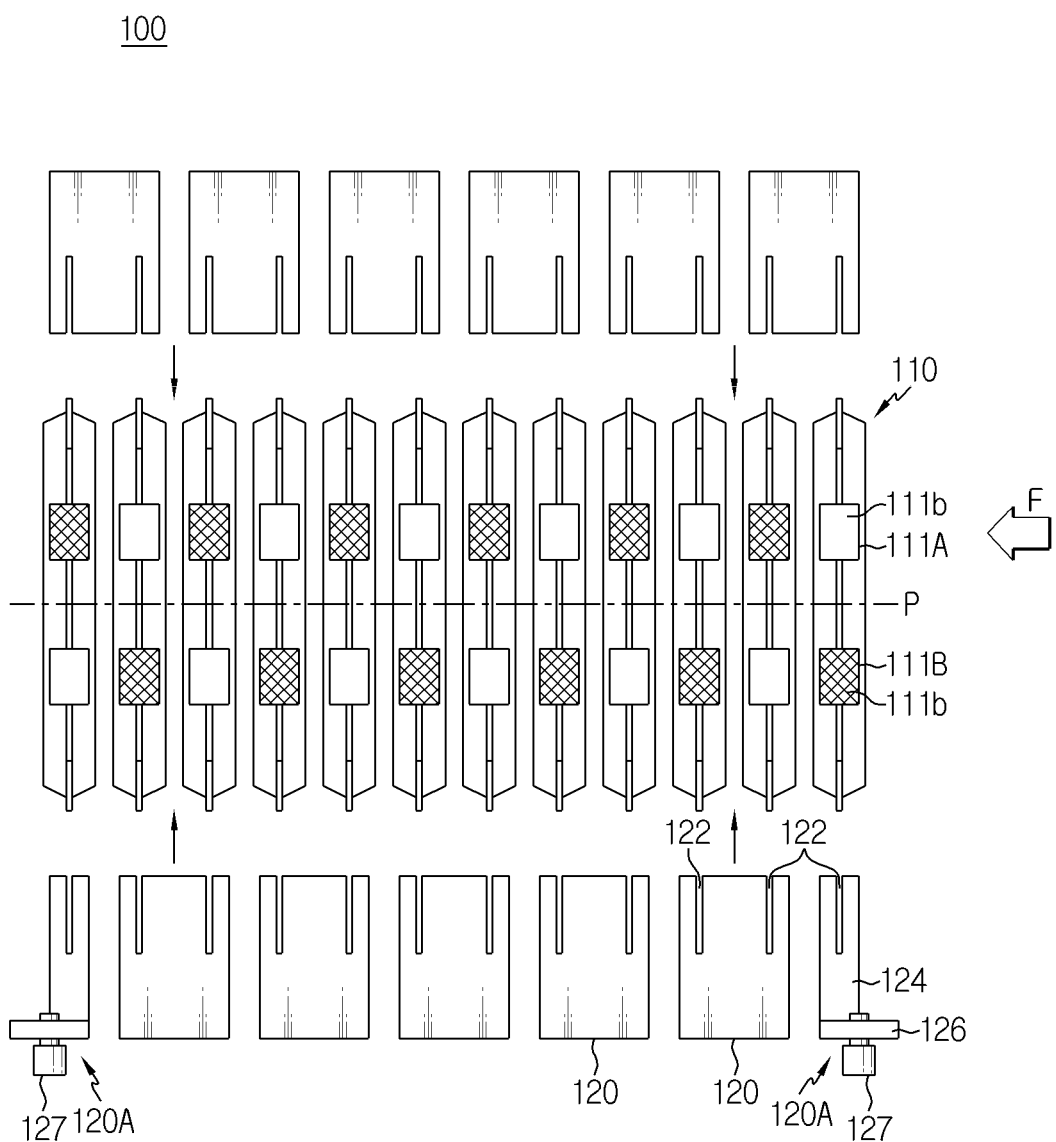
FIG. 3 is an exploded plan view schematically showing components of the battery module according to an embodiment of the present disclosure in a separated state.
Figure 4:
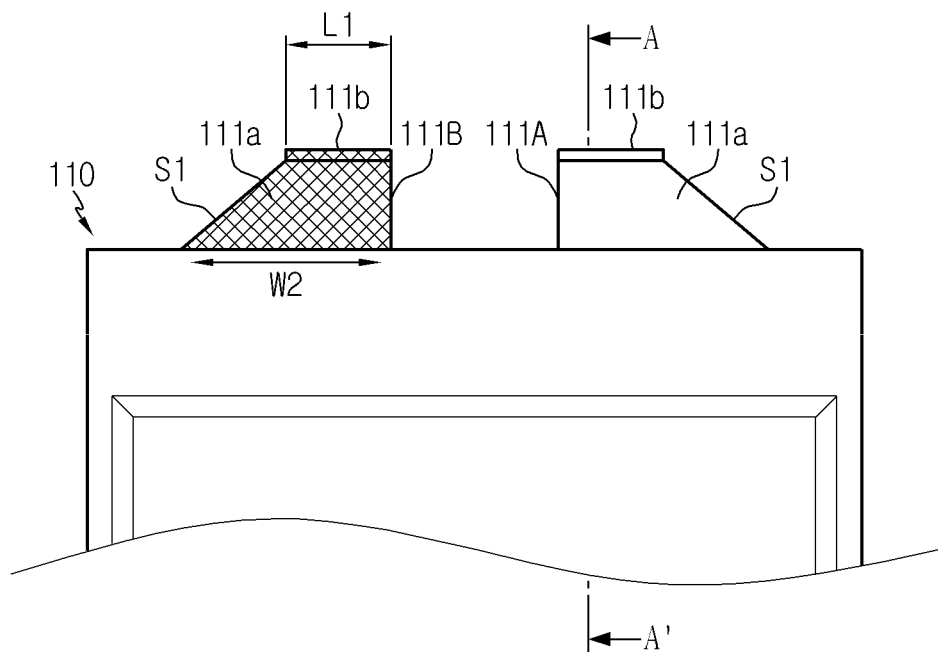
FIG. 4 is a front view schematically showing a portion of a secondary battery, which is a component of the battery module according to an embodiment of the present disclosure.
Figure 5:
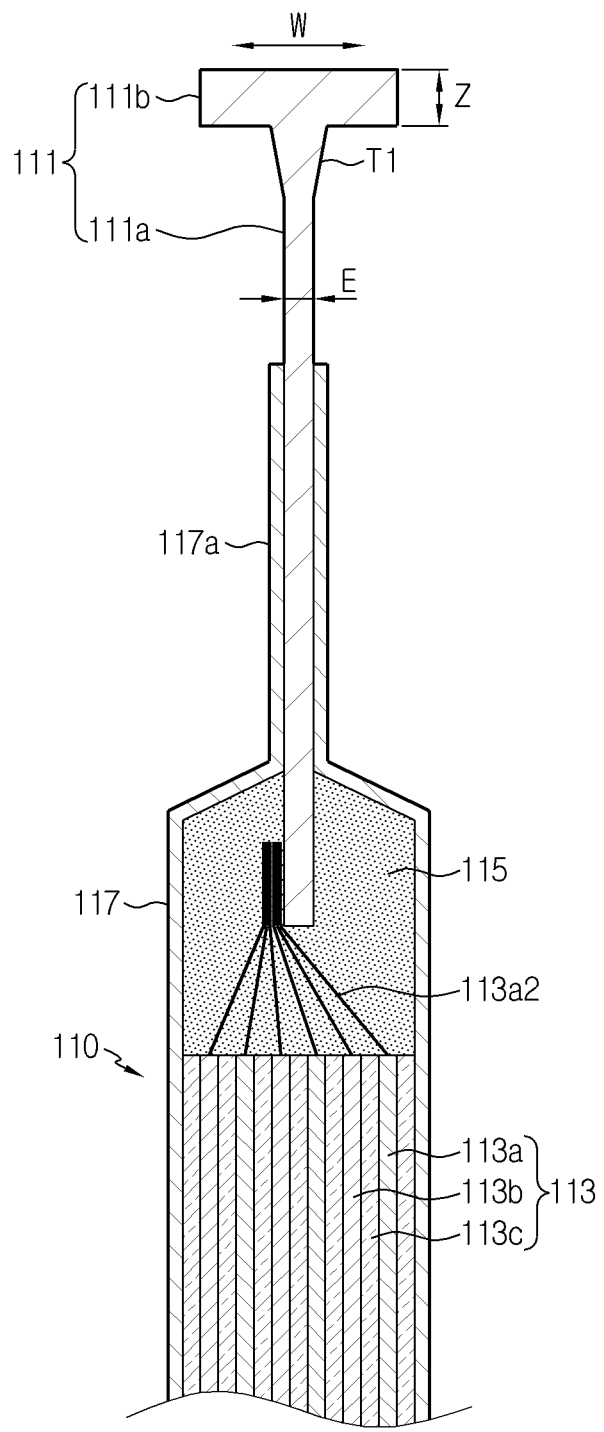
FIG. 5 is a longitudinal section view schematically showing the battery module, taken along line A-A' of FIG. 4.

FIG. 1 is a perspective view schematically showing a battery module according to an embodiment of the present disclosure. FIG. 2 is a plan view schematically showing the battery module according to an embodiment of the present disclosure. FIG. 3 is an exploded plan view schematically showing components of the battery module according to an embodiment of the present disclosure in a separated state. FIG. 4 is a front view schematically showing a portion of a secondary battery, which is a component of the battery module according to an embodiment of the present disclosure. Also, FIG. 5 is a longitudinal section view schematically showing the battery module, taken along line A-A' of FIG. 4.

Referring to FIGS. 1 to 5, a battery module 100 according to an embodiment of the present disclosure may include a plurality of secondary batteries 110. Also, the plurality of secondary batteries 110 may be arranged in a front and rear direction, when viewed in the F direction.

Meanwhile, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case when viewed in the F direction.

Here, the secondary battery 110 may be a pouch-type secondary battery 110. The pouch-type secondary battery 110 may include an electrode assembly 113, an electrolyte 115, and an exterior case 117.

Here, the electrode assembly 113 may be configured to have at least one positive electrode plate 113a and at least one negative electrode plate 113b with a separator 113c being interposed therebetween. More specifically, the electrode assembly 113 may be a stack-type electrode assembly in which a plurality of positive electrode plates 113a and a plurality of negative electrode plates 113b are alternately stacked with the separators 113c being interposed therebetween. For example, as shown in FIG. 5, the electrode assembly 113 of the present disclosure may be a stack-type electrode assembly in which a plurality of positive electrode plates 113a and a plurality of negative electrode plates 113b are alternately stacked with the separators 113c being interposed therebetween.

In addition, the secondary battery 110 may be a lithium secondary battery 110 provided with a lithium-based active material.

Moreover, the exterior case 117 may accommodate the electrode assembly 113 and the electrolyte 115 in an inner space thereof. Here, the exterior case 117 may be a pouch-type exterior case 117. Specifically, the pouch-type exterior case 117 may include an outer insulating layer, a metal layer, and an inner adhesive layer. The pouch-type exterior case 117 may accommodate the electrode assembly 113 therein.

Further, the pouch-type exterior case 117 may be configured to contain a metal film, for example an aluminum film, in order to protect internal components such as the electrode assembly 113 and the electrolyte 115 and to improve the electrochemical properties and the heat dissipation properties of the electrode assembly 113 and the electrolyte 115.

In addition, the aluminum film may be interposed between insulating layers made of an insulating material in order to ensure electrical insulation with internal components of the secondary battery 110 such as the electrode assembly 113 and the electrolyte 115 or with other components out of the secondary battery 110.

In particular, the pouch-type exterior case 117 may include two pouches, and a concave inner space may be formed in at least one of the pouches. In addition, the electrode assembly 113 may be accommodated in the inner space of the exterior case 117. Also, sealing portions 117a may be provided to outer circumferences of the two pouches so that the sealing portions 117a are fused to each other to seal the inner space in which the electrode assembly 113 is accommodated.

In addition, the pouch-type secondary battery 110 may include an electrode lead 111. Further, the electrode lead 111 may include a positive electrode lead 111A and a negative electrode lead 111B. Specifically, the electrode lead 111 may be configured to protrude outward from the sealing portion 117a located at the upper outer circumference of the pouch-type exterior case 117. Also, the electrode lead 111 may function as an electrode terminal of the secondary battery 110.

Referring to FIGS. 4 and 5 again, the electrode lead 111 formed at the secondary battery 110 may include a body 111a and a head 111b.

Specifically, the body 111a may at least partially have a plate shape. That is, for example, as shown in FIG. 4, the electrode lead 111 may be erected in the upper and lower direction with respect to the ground when viewed from the front (in the F direction of FIG. 1), and two broad surfaces may be located in the front and rear direction.

In addition, one end of the electrode lead 111 may be electrically connected to the positive electrode plate 113a or the negative electrode plate 113b of the electrode assembly 113. More specifically, a positive electrode tab 113a2 and a negative electrode tab (not shown) protruding and extending outward may be formed at a respective end of the positive electrode plate 113a and the negative electrode plate 113b. In addition, a portion of the positive electrode tab 113a2 and a portion of the negative electrode tab may be in contact with one end of the respective electrode lead 111.

Moreover, one end of the body 111a at an inward side may be located inside the exterior case 117. That is, the inward end of the body 111a may be located inside the exterior case 117 to contact a portion of the positive electrode tab 113a2 or a portion of the negative electrode tab (not shown).

In addition, the other end of the body 111a may be formed to protrude outward from the exterior case 117. That is, the outward end of the body 111a may be positioned to be exposed out of the exterior case 117. For example, as shown in FIG. 5, one end of the body 111a of the electrode lead 111 at a lower side may be located inside the exterior case 117. Also, the other end of the body 111a at an upper side may be formed to protrude upward from the exterior case 117.

Meanwhile, the head 111b may have a plate shape extending in both directions W perpendicular to the protruding direction of the body 111a from the other end of the body 111a. For example, as shown in FIG. 5, the electrode lead 111 has a plate-shaped head 111b extending in both directions (in the front and rear directions) perpendicular to the protruding direction (the upper and lower directions) of the body 111a from the other end of the body 111a.

Thus, according to this configuration of the present disclosure, since the electrode lead 111 has the body 111a and the head 111b, when the head 111b is joined to the bus bar 120, one surface of the head 111b may be disposed to be in contact with one surface of the bus bar 120 without performing a process of bending the electrode lead 111 so that an end of the electrode lead 111 comes into contact with one surface of the bus bar 120, thereby effectively reducing the process time and manufacturing cost for the battery module 100.

Further, the electrode lead 111 may be at least partially made of an electrically conductive material. For example, the electrode lead 111 may include copper, aluminum, nickel, and combinations thereof as the electrically conductive material.

The configuration of the pouch-type secondary battery 110 described above is obvious to those skilled in the art and thus will not described in detail. In addition, the battery module according to the present disclosure may adopt various kinds of secondary batteries 110 known at the time of filing this application.

Referring to FIGS. 1 to 4 again, the battery module 100 may include at least one bus bar 120. Specifically, the bus bar 120 may be configured to have a plate form at least partially made of an electrically conductive material.

In addition, the electrically conductive material may include, for example, copper, aluminum, nickel, and combinations thereof. For example, as shown in FIG. 3, the battery module 100 may include thirteen bus bars 120. Moreover, the thirteen bus bars 120 may at least partially have a rectangular plate form.

Also, the bus bar 120 may have at least one slit 122 formed thereto to extend inward from one end thereof. In addition, a portion of the body 111a may be inserted into the slit 122. At this time, a lower surface of the head 111b may be positioned to face an upper surface of the bus bar 120.

For example, as shown in FIG. 3, at least one slit 122 extending into the bus bar 120 from one end of the bus bar adjacent to the secondary battery 110 may be formed in each of the thirteen bus bars 120. Moreover, as shown in FIG. 2, a portion of the body 111a of each of the plurality of secondary batteries 110 may be inserted into each slit 122 formed in the thirteen bus bars 120.

In addition, the lower surface of the head 111b may be positioned to face the upper surface of the bus bar 120. For example, as shown in FIG. 2, when viewed in the F direction, the battery module 100 may include seven bus bars 120 at one side (a left side) with respect to a center line P of the battery module 100 in the front and rear direction. Further, as shown in FIG. 3, the seven bus bars 120 may move toward the center of the battery module 100 and be coupled thereto such that the twelve electrode leads 111 in total formed at one side with respect to the center line of the battery module 100 are inserted into twelve slits 122 formed at the seven bus bars 120, respectively.

Likewise, when viewed in the F direction, the six bus bars 120 located at the other side (a right side) with respect to the center line P of the battery module 100 in the front and rear direction may move toward the center of the battery module 100 and be coupled thereto such that twelve electrode leads 111 in total formed at the other side with respect to the center line of the battery module 100 are inserted into twelve slits 122 formed at the six bus bars 120, respectively.

Further, the bus bar 120 may have a plate portion 124 having a plate shape and an upward extending portion 126 extending upward from the plate portion 124. In addition, an external input/output terminal 127 may be formed at the upward extending portion 126 of the bus bar 120. For example, as shown in FIG. 1, among the plurality of bus bars 120, two bus bars 120A respectively positioned at the foremost and rearmost sides of the battery module 100 may include a plate portion 124 and an upward extending portion 126. Further, a bolt-type external input/output terminal 127 may be inserted into and fixed to the upward extending portion 126.

Referring to FIG. 5 again, the head 111b may have a thickness Z in a direction facing the bus bar 120, which is greater than a thickness E of the body 111a in a direction perpendicular to a relatively broader side surface of the body 111a among side surfaces of the body 111a. In other words, the thickness Z of the head 111b in the upper and lower direction may be greater than the thickness E of the body 111a in the front and rear direction. For example, as shown in FIG. 5, the thickness E of the broad side surface of the body 111a may be 0.2 mm to 0.4 mm. Also, the head 111b may have a thickness Z of about 1.0 mm in the upper and lower direction.

Thus, according to this configuration of the present disclosure, since the head 111b is formed thicker than the body 111a, the region of the electrode lead 111 melted and bonded to the bus bar 120 when welded thereto may be increased, compared to the conventional electrode lead 111 that is welded in thickness of 0.2 mm to 0.4 mm, thereby greatly increasing connection reliability and joining strength.

In addition, at least a portion of the body 111a may have a thickness E gradually increasing toward the head 111b in a direction perpendicular to the relatively broader side surface of the body 111a. For example, the body 111a has a structure (a tapered structure) T1 whose thickness gradually increases from a portion of the body 111a exposed out of the exterior case 117 to an inner surface (a lower surface) of the head 111b.

Thus, according to this configuration of the present disclosure, since the thickness of at least a portion of the body 111a of the bus bar 120 increases gradually toward the head 111b, the connecting portion between the lower surface of the head 111b and the other end of the body 111a may have enhanced mechanical rigidity. By doing so, it is possible to prevent the connection portion between the lower surface of the head 111b and the other end of the body 111a from being damaged by physical force or vibration while being welded with the bus bar 120.

Figure 6:
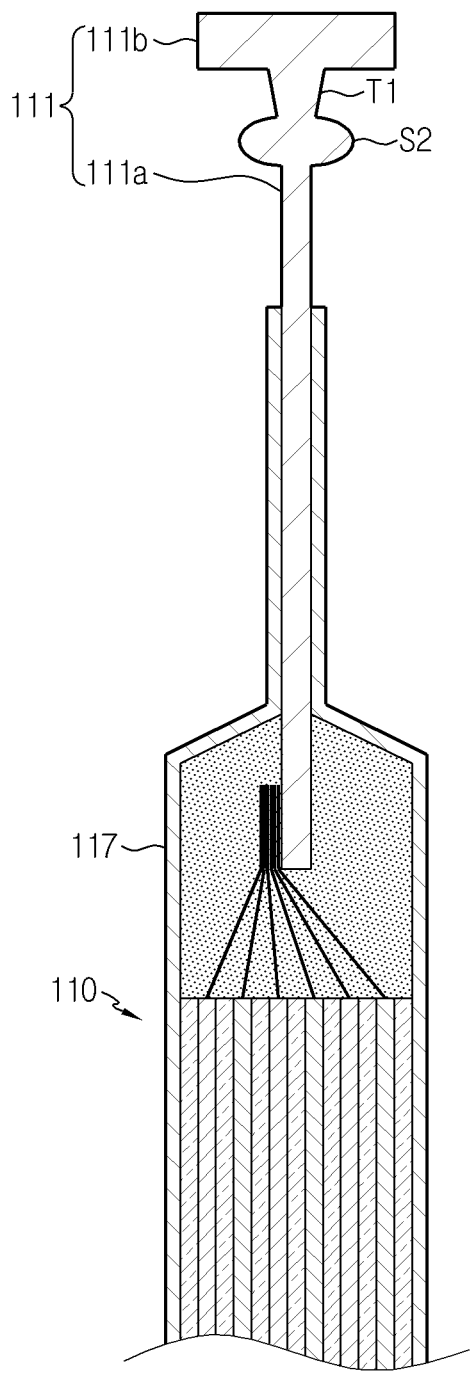
FIG. 6 is a longitudinal section view schematically showing a portion of a secondary battery, employed in the battery module according to another embodiment of the present disclosure.

FIG. 6 is a longitudinal section view schematically showing a portion of a secondary battery, employed in the battery module according to another embodiment of the present disclosure.

Referring to FIG. 6, a stopper S2 protruding outward (in a horizontal direction) may be formed on a portion of the body 111a. Specifically, the stopper S2 may be formed on a relatively broader side surface of the electrode lead 111. For example, as shown in FIG. 6, a protrusion-shaped stopper S2 protruding forward or rearward may be formed on each of the front surface and the rear surface of the electrode lead 111.

Here, the outward direction means a direction toward a relatively outer side with respect to the inner center of the battery module. In addition, the horizontal direction means a direction parallel to the ground on which the battery module is placed.

Thus, according to this configuration of the present disclosure, since the stopper S2 is formed on a portion of the body 111a of the electrode lead 111, when a portion of the body 111a is inserted into the slit 122 of the bus bar 120, the head 111b may be prevented from moving in the upper and lower direction, and the lower surface of the head 111b may be fixed on the upper surface of the bus bar 120. As a result, the electrode lead 111 and the bus bar 120 may be welded more easily.

Referring to FIG. 4 again, at least a portion of the body 111a may have a width gradually decreasing toward the head 111b. Specifically, the body 111a may be shaped such that its width W2 in the left and right direction gradually decreases as it approaches the head 111b, resulting in an inclined structure S1. As shown, the head 111b may be formed to have a length L1 similar to the width W2 of the end of the body 111a. Also, the electrode lead 111 may include a first electrode lead 111A and a second electrode lead 111B provided at the same side surface of the secondary battery 110 and having different electrical polarities from each other.

For example, as shown in FIG. 4, the positive electrode lead 111A may have an inclined structure S1 such that at least a portion of the body 111a has a width gradually decreasing as it approaches the head 111b. Such inclined structure S1 of the positive electrode lead 111A may be formed at a right side with respect to the center of the body 111a of the positive electrode lead 111A. Also, the negative electrode lead 111B may have an inclined structure S1 such that at least a portion of the body 111a has a width gradually decreasing as it approaches the head 111b. Such inclined structure of the negative electrode lead 111B may be formed at a left side with respect to the center of the body 111a of the negative electrode lead 111B.

Thus, according to this configuration of the present disclosure, since the inclined structure S1 is formed in at least a portion of the body 111a of the electrode lead 111, it is possible to reduce the material cost of the electrode lead 111. Moreover, since the body 111a may be inserted into the slit 122 of the bus bar 120 by using the inclined structure S1, and the length of the body 111a inserted into the slit 122 may be shortened, the inserting process may be performed more easily.

Further, the heads 111b of the first electrode lead 111A and the second electrode lead 111B may be formed to be biased toward one side or the other side with respect to the center of the body 111a so as to be positioned adjacent to each other. For example, as shown in FIG. 4, the head 111b of the positive electrode lead 111A may be formed to be biased to the left with respect to the center of the body 111a. In addition, the head 111b of the negative electrode lead 111B may be formed to be biased to the right with respect to the center of the body 111a. That is, the heads 111b of the positive electrode lead 111A and the negative electrode lead 111B may be located close to the center of the secondary battery 110 in the left and right direction.

Thus, according to this configuration of the present disclosure, if the heads 111b of the first electrode lead 111A and the second electrode lead 111B of the present disclosure are formed to be biased toward one side or the other side with respect to the center of the body 111a so as to be positioned adjacent to each other, the bus bars 120 respectively connected to the first electrode lead 111A and the second electrode lead 111B may be positioned close to the center of the secondary battery 110, thereby effectively reducing the volume of the battery module 100.

Figure 7:
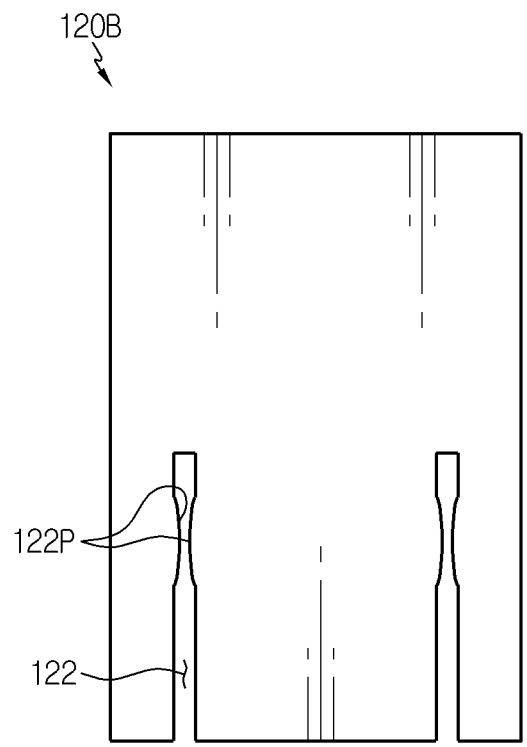
FIG. 7 is a plan view schematically showing one bus bar according to another embodiment of the present disclosure.

FIG. 7 is a plan view schematically showing one bus bar according to another embodiment of the present disclosure.

Referring to FIG. 7 along with FIGS. 2 and 5, a fixing protrusion 122P protruding toward the inserted body 111a of the electrode lead 111 may be formed at any portion of the inner surface of the slit 122 of the bus bar 120B. For example, as shown in FIG. 7, two fixing protrusions 122P protruding toward the inserted body 111a of the electrode lead 111 may be formed at the slit 122 of the bus bar 120B. That is, a portion of the body 111a of the electrode lead 111 may be inserted between the two fixing protrusions 122P to press and fix the body 111a.

Thus, according to this configuration of the present disclosure, since the fixing protrusion 122P is formed on the inner surface of the slit 122 of the bus bar 120B, the inserted electrode lead 111 may be stably maintained in the inserted and fixed state, thereby allowing the bus bar 120B and the electrode leads 111 to be welded easily.

Figure 8:
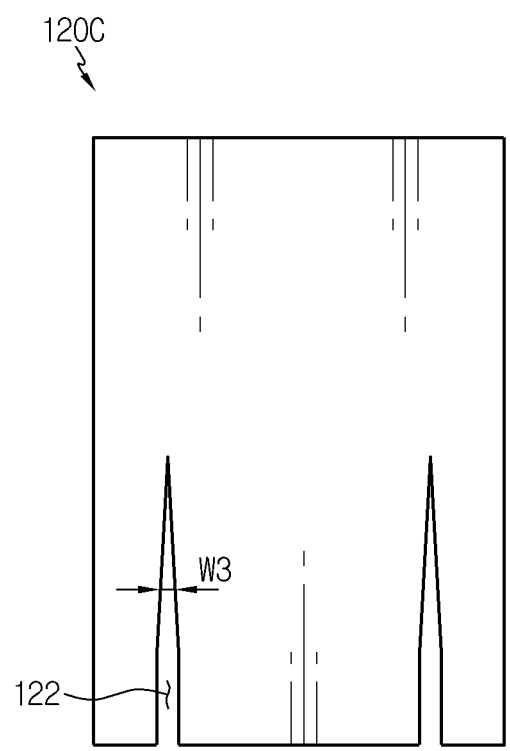
FIG. 8 is a plan view schematically showing another bus bar according to still another embodiment of the present disclosure.

FIG. 8 is a plan view schematically showing another bus bar according to still another embodiment of the present disclosure.

Referring to FIG. 8 along with FIG. 5, the bus bar 120C may be shaped such that at least a portion of the slit 122 has a spaced width W3 gradually decreasing inward from one end thereof. That is, the inner portion of the slit 122 of the bus bar 120C has a small spaced width W3 so that a portion of the body 111a of the electrode lead 111 inserted into the slit 122 is pressed and fixed therein.

Thus, according to this configuration of the present disclosure, since the bus bar 120C is shaped such that the spaced width W3 of the slit 122 gradually decreases inward from one end thereof, the inserted electrode lead 111 may stably maintain its inserted and fixed state due to the width W3 of the narrowed slit 122, which facilitates the welding process between the bus bar 120C and the electrode lead 111.

Figure 9:
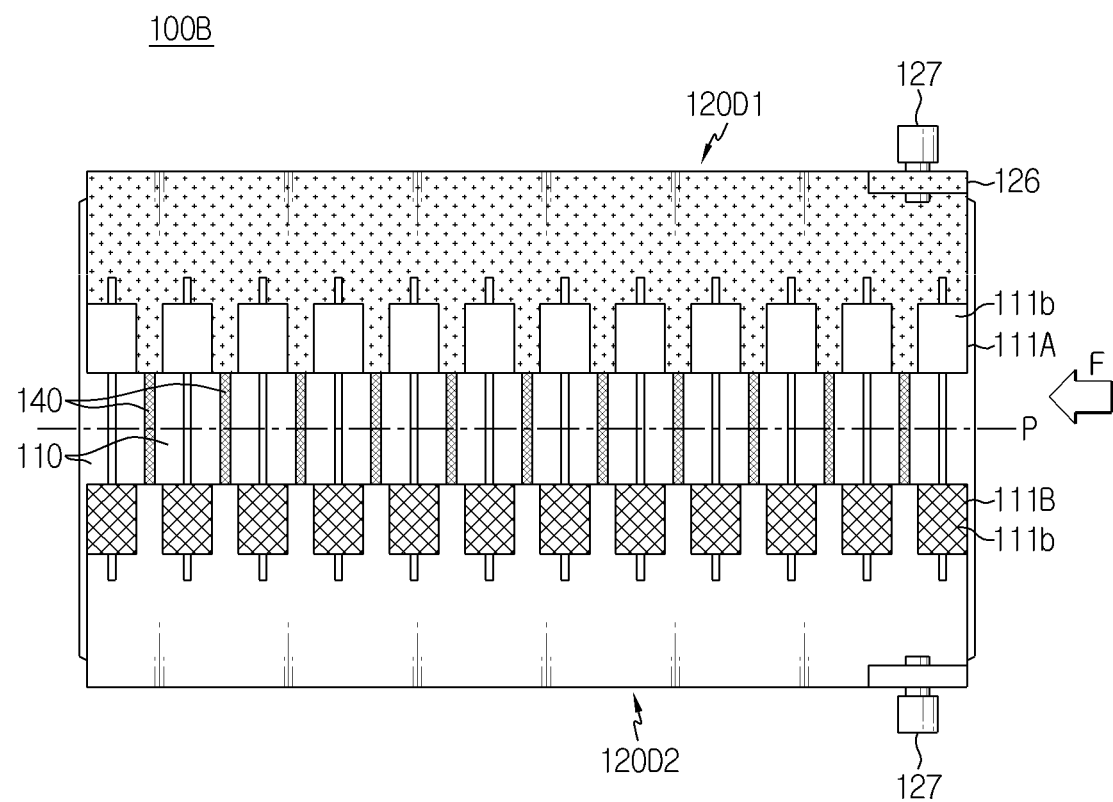
FIG. 9 is a plan view schematically showing a battery module according to another embodiment of the present disclosure.
Figure 10:
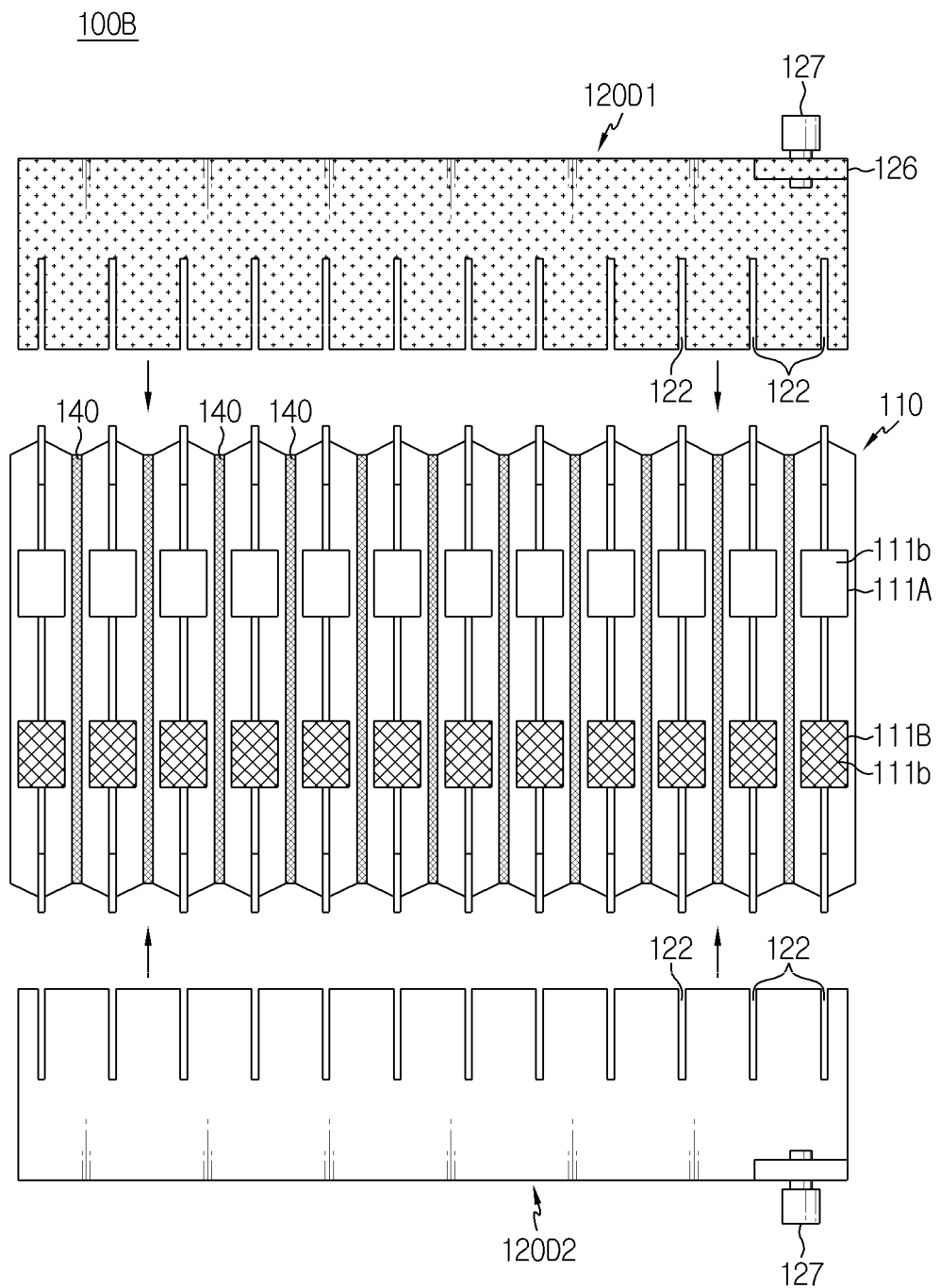
FIG. 10 is an exploded plan view schematically showing components of the battery module according to another embodiment of the present disclosure in a separated state.

FIG. 9 is a plan view schematically showing a battery module according to another embodiment of the present disclosure. Also, FIG. 10 is an exploded plan view schematically showing components of the battery module according to another embodiment of the present disclosure in a separated state. Here, the secondary battery 110 depicted in FIGS. 9 and 10 is identical to the secondary battery 110 of FIG. 2 described above, and thus the secondary battery 110 depicted in FIGS. 9 and 10 will not be described in detail again.

Referring to FIGS. 9 and 10, the arrangement of the plurality of secondary batteries 110 shown in FIG. 9 is different from the arrangement of the plurality of secondary batteries 110 shown in FIG. 2. That is, all of the plurality of secondary batteries 110 of the battery module 100 may be arranged such that the first electrode leads 111A are located at one side and the second electrode leads 111B are located at the other side.

For example, as shown in FIG. 9, when viewed from the F direction, the plurality of secondary batteries 110 of the battery module 100B may be arranged such that the first electrode leads 111A (the positive electrode leads) are positioned at one side (a right side) with respect to the center line P of the battery module 100B in the front and rear direction, and the second electrode leads 111B (the negative electrode leads) are positioned at the other side (a left side) with respect to the center line P of the battery module 100B in the front and rear direction.

In addition, the battery module 100B may include a first bus bar 120D1 and a second bus bar 120D2 configured to electrically connect the first electrode leads 111A or the second electrode leads 111B of the plurality of secondary batteries 110. For example, as shown in FIG. 9, the battery module 100B may include a first bus bar 120D1 and a second bus bar 120D2. In addition, the first bus bar 120D1 located at one side (a right side) with respect to the center line P of the battery module 100B may be configured such that the bodies 111a of twelve first electrode leads 111A are inserted into twelve slits 122 formed at the first bus bar 120D1, so as to be electrically connected to the twelve first electrode leads 111A.

In addition, for example, as shown in FIG. 9, the second bus bar 120D2 located at the other side (a left side) with respect to the center line P of the battery module 100B may be configured such that the bodies 111a of the twelve second electrode leads 111B are respectively inserted into the twelve slits 122 formed at the second bus bar 120D2, so as to be electrically connected to the twelve second electrode leads 111B.

Meanwhile, the first bus bar 120D1 may include the same material as the first electrode leads 111A of the plurality of secondary batteries 110. For example, the first bus bar 120D1 may include the same aluminum material as the first electrode lead 111A. In addition, the second bus bar 120D2 may include the same material as the second electrode leads 111B of the plurality of secondary batteries 110. For example, the second bus bar 120D2 may include the same copper material as the second electrode lead 111B.

Further, the external input/output terminal 127 may be formed at each of the first bus bar 120D1 and the second bus bar 120D2. For example, as shown in FIG. 9, the upward extending portion 126 is formed at each of the first bus bar 120D1 and the second bus bar 120D2, and the bolt-type external input/output terminal 127 may be inserted into and fixed to the upward extending portion 126.

Referring to FIG. 9 again, the plurality of secondary batteries 110 may be arranged to be stacked in one direction (a front and rear direction). In addition, an adhesive or double-sided adhesive tape 140 may be added between the plurality of secondary batteries 110 so that the plurality of secondary batteries 110 are bonded to each other. Moreover, the adhesive or double-sided adhesive tape 140 may include a material with high thermal conductivity.

Thus, according to this configuration of the present disclosure, since the adhesive or double-sided adhesive tape 140 is added between the plurality of secondary batteries 110, it is easy to handle the plurality of secondary batteries 110 as one unit, and a gap is not generated between the plurality of secondary batteries 110 due to the added adhesive or double-sided adhesive tape 140, thereby preventing heat condensation from occurring therein due to the air formed in the gap. Further, if the thermally conductive material is included in the adhesive or double-sided adhesive tape 140, the cooling efficiency of the battery module 100B may be further increased.

Figure 11:
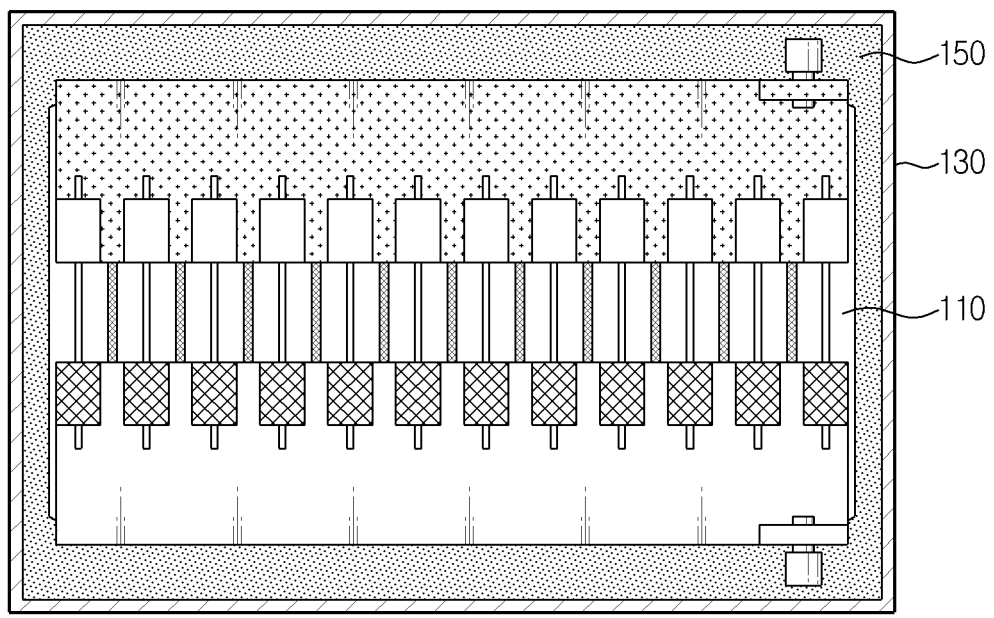
FIG. 11 is a plan view schematically showing a battery module according to still another embodiment of the present disclosure.

FIG. 11 is a plan view schematically showing a battery module according to still another embodiment of the present disclosure.

Referring to FIG. 11, the battery module 100C may further include a module case 130 having an inner space formed therein to accommodate the plurality of secondary batteries 110. Specifically, the module case 130 may have a rectangular box shape with an open top. In addition, the plurality of secondary batteries 110 and the plurality of bus bars 120 may be accommodated in the inner space of the module case 130. Further, the module case 130 may be filled with a thermally conductive resin 150 to surround the outer surface of the plurality of secondary batteries 110. For example, the thermally conductive resin 150 may include a silicon-based resin, a modified silicone resin, or an acrylic resin.

Thus, according to this configuration of the present disclosure, since the thermally conductive resin 150 is filled in the module case 130, it is possible to effectively transfer the heat generated from the plurality of secondary batteries 110 to the module case 130, thereby effectively enhancing the cooling efficiency of the battery module 100C.

Meanwhile, a battery pack (not shown) according to the present disclosure may include at least one battery module 100 according to the present disclosure. Also, the battery pack according to the present disclosure may further include a pack case for accommodating the battery module 100, and various devices for controlling the charge and discharge of the battery module 100, such as a battery management system (BMS), a current sensor and a fuse, in addition to the battery module 100.

In addition, the battery pack according to the present disclosure may be applied to a moving means such as a vehicle. For example, an electric vehicle according to the present disclosure may include the battery pack according to the present disclosure.

Meanwhile, even though the terms indicating directions such as upper, lower, left, right, front and rear directions are used in the specification, it is obvious to those skilled in the art that these merely represent relative positions for convenience of explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs ||
| --- | --- |
| 100: battery module | |
| 110: secondary battery | 111: electrode lead |
| 111a: body | 111b: head |
| 120: bus bar | 122: slit |
| 124: plate portion | 126: upward extending portion |
| 130: module case | 140: double-sided adhesive tape |
| 150: thermally conductive resin | |

INDUSTRIAL APPLICABILITY

The present disclosure relates to a battery module and a battery pack, which includes a secondary battery and a bus bar. In addition, the present disclosure is available for industries related to electronic devices or vehicles equipped with the battery pack.

What is claimed is:

1. A battery module, comprising:
a plurality of secondary batteries, each including an electrode assembly having a positive electrode plate and a negative electrode plate with a separator being interposed therebetween, an electrolyte, and an exterior case configured to accommodate the electrode assembly and the electrolyte in an inner space thereof, each of the plurality of secondary batteries also including an electrode lead having a body and a plate-shaped head, a first end of the body being electrically connected to the positive electrode plate or the negative electrode plate of the electrode assembly and a second end of the body protruding outward from the exterior case along a protruding direction, the plate-shaped head extending outwardly from the second end of the body in both a first direction and a second direction that are opposite to one another and are perpendicular to the protruding direction, such that a first portion of the plate-shaped head extends outwardly from the body in the first direction and a second portion of the plate-shaped head extends outwardly from the body in the second direction, the first portion having a first contact surface facing towards the first end of the body and the second portion having a second contact surface facing towards the first end of the body, the electrode lead being at least partially made of an electrically conductive material; and
a bus bar having a plate shape defining an upper surface and an opposing lower surface, the bus bar being at least partially made of an electrically conductive material, the bus bar having a slit extending inward from one end thereof, and the bus bar being positioned so that a portion of the body of a first one of the electrode leads is received within the slit and the upper surface of the bus bar engages both the first and second contact surfaces of the plate-shaped head of the first electrode lead.

2. The battery module according to claim 1,
wherein a thickness of the head in a direction facing the bus bar is greater than a thickness of the body in a direction perpendicular to a side surface of the body.

3. The battery module according to claim 2,
wherein at least a portion of the body has a thickness gradually increasing toward the head.

4. The battery module according to claim 1,
wherein the electrode lead has a protrusion integrally formed therewith and projecting outwardly from the body between the first and second ends of the body.

5. The battery module according to claim 1,
wherein at least a portion of the body has a width gradually decreasing toward the head.

6. The battery module according to claim 5,
wherein the electrode lead includes a first electrode lead and a second electrode lead provided on the same side of the secondary battery and having different electric polarities, and
wherein heads of the first electrode lead and the second electrode lead are biased to one side or the other side of the center of the body so as to be positioned adjacent to each other.

7. The battery module according to claim 1,
wherein an inner surface of the slit defines a fixing protrusion protruding toward the body of the electrode lead when the body of the electrode lead is positioned within the slit.

8. The battery module according to claim 1,
wherein the slit defines a space having a width that gradually decreases along at least a portion of the slit towards one end of the slit.

9. A secondary battery, comprising:
an electrode assembly having a positive electrode plate and a negative electrode plate with a separator being interposed therebetween;
an electrolyte;
an exterior case configured to accommodate the electrode assembly and the electrolyte in an inner space thereof; and
an electrode lead having a body and a plate-shaped head, a first end of the body being electrically connected to the positive electrode plate or the negative electrode plate of the electrode assembly and a second end of the body protruding outward from the exterior case along a protruding direction so that a portion of the body can be inserted into a slit extending inward from an end of a bus bar, the plate-shaped head extending in both directions perpendicular to the protruding direction of the body from the second end of the body, the electrode lead being at least partially made of an electrically conductive material, and the electrode lead having a protrusion integrally formed therewith and projecting outwardly from the body between the first and second ends.

10. A battery pack, comprising at least one battery module according to claim 1.

11. A vehicle, comprising the battery pack according to claim 10.

12. The secondary battery according to claim 9,
wherein a thickness of the head in a direction facing the bus bar is greater than a thickness of the body in a direction perpendicular to a side surface of the body.

13. The secondary battery according to claim 12,
wherein at least a portion of the body has a thickness gradually increasing toward the head.

14. The secondary battery according to claim 9,
wherein at least a portion of the body has a width gradually decreasing toward the head.

15. The secondary battery according to claim 14,
wherein the electrode lead includes a first electrode lead and a second electrode lead provided on the same side of the secondary battery and having different electric polarities, and
wherein heads of the first electrode lead and the second electrode lead are biased to one side or the other side of the center of the body so as to be positioned adjacent to each other.

16. A battery module, comprising:
at least one secondary battery according to claim 9; and
the bus bar, wherein the bus bar has a plate shape and is at least partially made of an electrically conductive material.

17. The battery module according to claim 16,
wherein an inner surface of the slit of the bus bar defines a fixing protrusion protruding toward the body of the electrode lead when the body of the electrode lead is positioned within the slit.

18. The battery module according to claim 16,
wherein the slit of the bus bar defines a space having a width that gradually decreases along at least a portion of the slit towards one end of the slit.

19. The battery module according to claim 16,
wherein a distance between the integrally formed protrusion and the plate-shaped head corresponds to a thickness of the bus bar.

\* \* \* \* \*